(12) United States Patent
Eikum

(10) Patent No.: US 8,432,067 B2
(45) Date of Patent: Apr. 30, 2013

(54) EXTERNAL ELECTRICAL POWER ADAPTER

(76) Inventor: John Joseph Eikum, Circle Pines, MN (US)

( * ) Notice: Subject to any disclaimer, the term of this patent is extended or adjusted under 35 U.S.C. 154(b) by 662 days.

(21) Appl. No.: 12/539,487

(22) Filed: Aug. 11, 2009

(65) Prior Publication Data

US 2010/0051427 A1    Mar. 4, 2010

Related U.S. Application Data

(60) Provisional application No. 61/092,976, filed on Aug. 29, 2008.

(51) Int. Cl.
*H02M 5/27* (2006.01)

(52) U.S. Cl.
USPC ............................................ 307/119; 363/146

(58) Field of Classification Search .................. 307/119; 363/146

See application file for complete search history.

(56) References Cited

U.S. PATENT DOCUMENTS

| | | | |
|---|---|---|---|
| 6,272,030 B1 * | 8/2001 | Oomura | 363/62 |
| 6,986,067 B2 | 1/2006 | Odaohhara et al. | |
| 7,219,243 B2 | 5/2007 | Lim | |
| 7,332,834 B2 | 2/2008 | Lee | |
| 7,365,515 B2 | 4/2008 | Takano et al. | |
| 7,516,343 B2 * | 4/2009 | Bhogal et al. | 713/320 |
| 2007/0300089 A1 | 12/2007 | Bhogal | |
| 2008/0130340 A1 * | 6/2008 | Unger et al. | 363/146 |
| 2008/0148082 A1 | 6/2008 | Shen et al. | |

FOREIGN PATENT DOCUMENTS

| | | |
|---|---|---|
| JP | 8205399 | 8/1996 |
| JP | 2000152499 | 5/2000 |

* cited by examiner

*Primary Examiner* — Daniel Cavallari
(74) *Attorney, Agent, or Firm* — Berggren Law Offices, LLC; William R Berggren

(57) ABSTRACT

An apparatus, system and method are disclosed for eliminating the power consumption of external electrical power adapters plugged into sources of power but detached from electrical devices they are intended to serve. The apparatus comprises a power-accessing plug, a power supply circuit, a first connector, and a second connector. The power-accessing plug is electrically connected to an external source of electrical power. The power supply circuit comprises circuitry to convert the external electrical source power into an electrical form useful for consumption by an electrical device. The first connector comprises a switch and is electrically connected to the plug and the power supply circuit. The switch (1) has an open position when the apparatus is not electrically and physically attached to an electrically powered device and (2) has a closed position when the apparatus is electrically and physically attached to the electrical device whereby current is able to flow through the apparatus. When the switch is in the open position, the open switch is able to prevent the consumption of any electrical power by the power adapter when the plug is electrically connected to the source of electrical power. The second connector comprises a first end electrically attached to the power supply circuit and a second end removeably electrically attached to the electrically powered device.

20 Claims, 2 Drawing Sheets

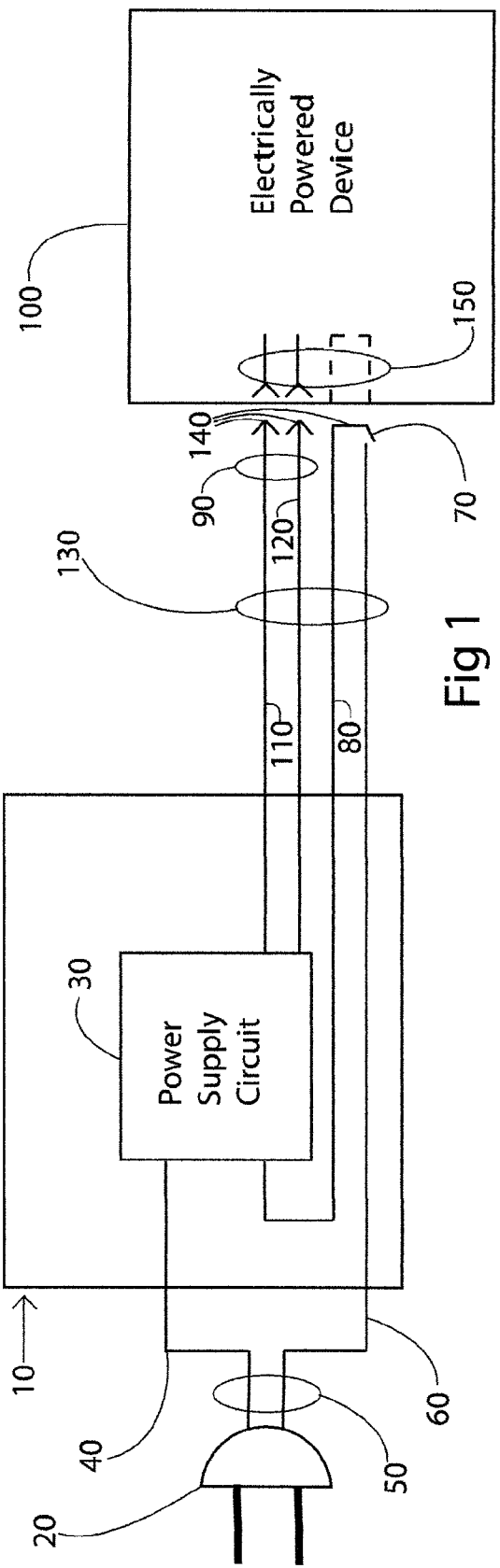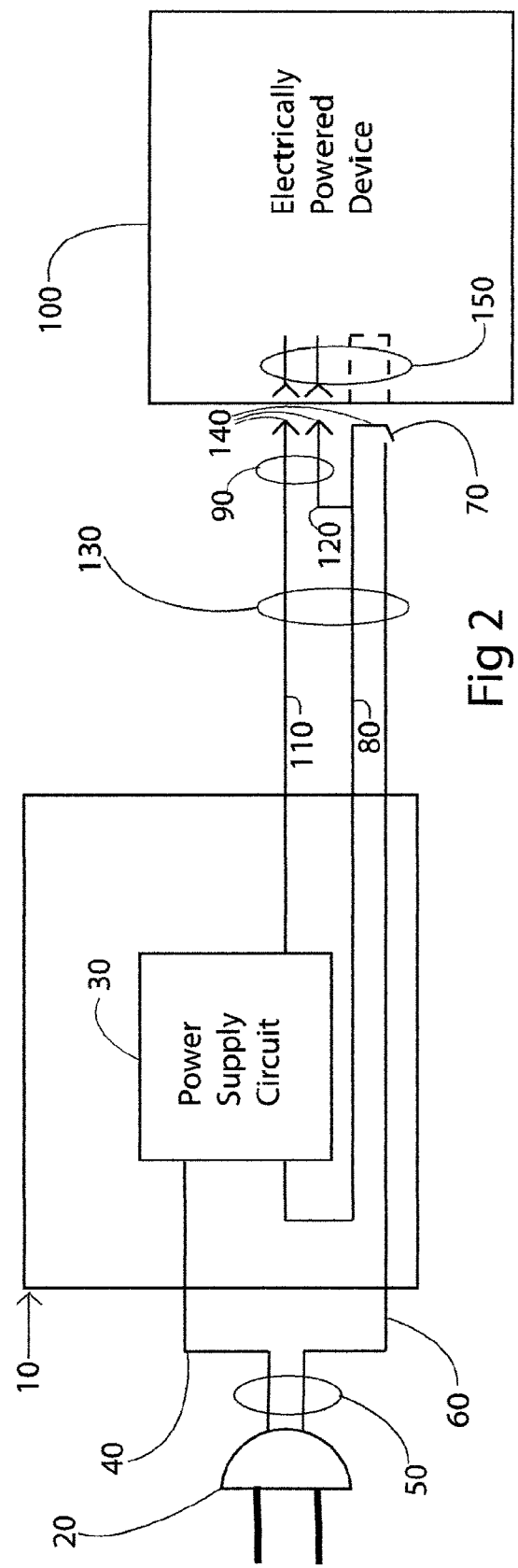

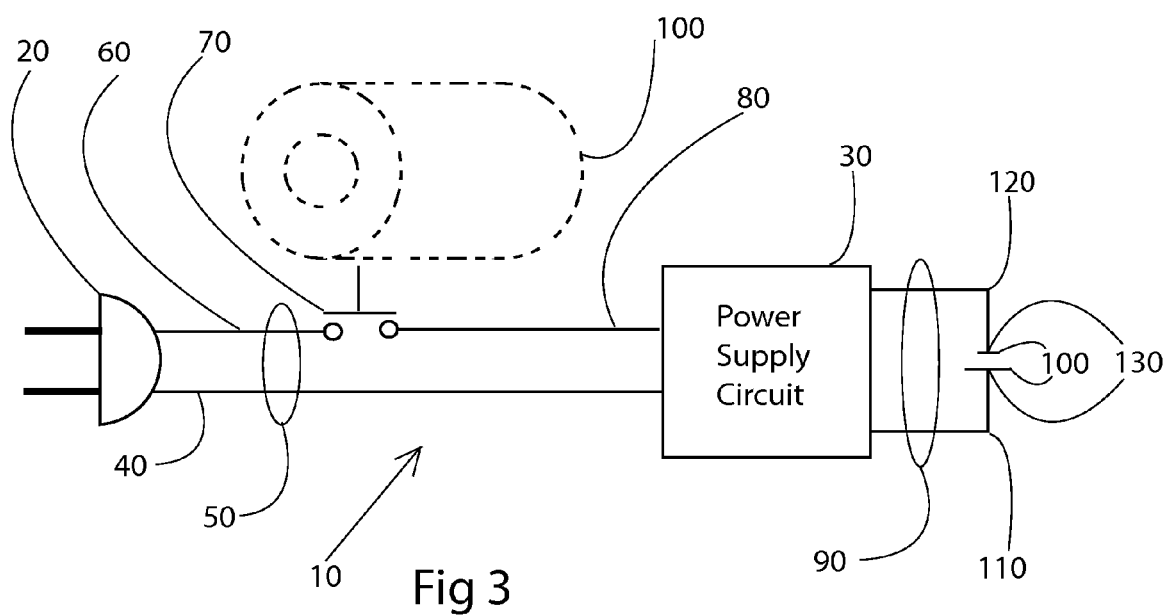

EXTERNAL ELECTRICAL POWER ADAPTER

CROSS REFERENCE TO RELATED APPLICATIONS

This application claims the benefit of PPA Appl No. 61/092,976 filed Aug. 29, 2008 by John J. Eikum.

FIELD OF THE INVENTION

This invention relates to wasted electrical power conservation and, particularly, to the elimination of wasted electrical power consumption in external electrical power adapters for electrically-powered devices.

BACKGROUND OF THE INVENTION

In recent years two trends, global warming and personal mobility, have come together to create a demand to reduce wasted electrical power. Global warming concerns have attracted public and government attention, prompting increased interest in reducing wasted electrical power consumption where possible. Advances in electronics, communications, and the internet have resulted in electrical devices that enable people to do many tasks also at home, in libraries and at other locations that were typically done only in an office. In addition, advances in battery technology have resulted in more versatile portable electronic devices that have enabled people to perform traditional office functions at more desirable and varied locations outside of an office or home. Moreover, external electrical power adapters have become more common as a means to convert electrical power from common electrical outlets into various forms used by these electrical devices and a means to power electrical devices in various locations.

Standby power is power consumed by electrical devices when a device is not in use but still connected to a source of power and is often considered wasted power. One form of wasted electrical power is the electrical power consumed by external electrical power adapters when attached electrical devices no longer need to consume electrical power or are disconnected from the power adapters. Although the electrical devices are not consuming power for an intended task, power is still consumed when electrical devices are attached to the power adapters and the latter are attached to power sources. Also the adapter still consumes power even after the device is disconnected from the adapter.

External power adapters have been modified to reduce wasted power consumption in these situations. Several power adapters have been disclosed that use monitoring circuitry to reduce current coming from a source of power into the power adapters when the electrical device is not in use, when the device is turned off or when the device is disconnected. Some use monitoring circuits and rechargeable batteries placed in devices to turn off a power adapter that they are connected to when not in use. However, all of these adapters may consume some power when devices are removed and adapters are left attached to power sources. Also, the monitoring circuitry itself consumes power when the device is attached to the adapter and consuming power. In adapters that use non-rechargeable batteries, the power adapter becomes inoperable with time.

There is still a need for an external electrical power adapter electrically attached to a source of power that does not draw any power from any source of electrical power when the adapter is physically disconnected from an electrical device that consumes electrical power.

SUMMARY OF THE INVENTION

I have invented an external electrical power adapter apparatus that is able to be electrically attached to a source of electrical power without drawing any power from any source of electrical power when the adapter is physically disconnected from an electrical device that consumes electrical power. The apparatus comprises a power-accessing plug, a power supply circuit, a first connector, and a second connector. The power-accessing plug is electrically connected to an external source of electrical power. The power supply circuit comprises circuitry to convert the external electrical source power into an electrical form useful for consumption by an electrical device. The first connector comprises a switch and is electrically connected to the plug and the power supply circuit. The switch (1) has an open position when the apparatus is not electrically and physically attached to an electrically powered device and (2) has a closed position when the apparatus is electrically and physically attached to the electrical device whereby current is able to flow through the apparatus. When the switch is in the open position, the open switch prevents the consumption of any electrical power by the power adapter when the plug is electrically connected to the source of electrical power. The second connector comprises a first end electrically attached to the power supply circuit and a second end removeably electrically attached to the electrically powered device.

I have also invented a system comprising an electrically powered device and the electrical power adapter apparatus described above.

In addition, I have invented a method of using an external electrical power adapter to convey power to an electrical device without the adapter consuming power from any source when the device is not electrically attached to the adapter and the adapter is electrically attached to an external source of electrical power. The method comprises four steps. One step is providing an electrical power adaptor apparatus as described above. Another step is electrically attaching the power adapter to an external source of electrical power. Still another step is physically and electrically attaching an electrically powered device to the power adapter apparatus and thereby closing the switch to permit current to flow to the power adapter apparatus and device. Another step is removing the electrically powered device from electrical and physical connection with the power adapter apparatus thereby opening the switch. In this manner, electrical power is no longer consumed by the power adapter apparatus even though the apparatus is electrically attached to the external source of electrical power.

The invention offers substantial savings in greenhouse gases created by burning coal and natural gas to create electricity because of the savings achieved in electrical power consumption. In 2008, 51% of electricity created in the US was from the burning of coal. The combustion of natural gas produced 17%. However, these processes also create a high level of carbon dioxide, a known greenhouse gas responsible for global warming. Electrically powered devices often consume power for no useful purpose, such as, for example, a plugged-in laptop power adapter which is not connected to the laptop or a plugged-in cell phone power adapter or rechargeable battery adapter that is not connected to the cell phone or rechargeable battery.

These adapters use standby power for such purposes as, for example, to constantly power circuits that permit the adapter to power electrical devices when desired and thus are constantly drawing current from a power source. Although the power needed for these functions is only in the milliwatt (mW) range, power adapters used to convert power into other forms, such as, for example, the alternating current (AC) line voltage to the low voltage needed to perform these functions, typically operate at very low efficiency when they are operating at low power. As a result, the power consumed from a source of power such as a wall socket is often in the range of one Watt (W) to ten W or more, even when only a few tens of mW or less are needed. For any single electrically powered device the load is never very large (the most inefficient designs draw 15-20 W), however when factored over all of the electrical power adapters in a country like the United States or a region like Europe, the load can come to many millions of watts.

My invention provides a reliable way to significantly reduce wasted electrical power consumption by eliminating a significant and growing cause of the waste. Because my invention eliminates the power consumption of electrical power adapters plugged into sources of electrical power but not into electrical devices, such practices as leaving power adapters for portable cell phones or laptops plugged in to a wall socket are a convenience that no longer wastes power. One always knows where the adapter is when needed and does not have to constantly plug and unplug the adapter because of a concern or guilt about the consumption of wasted power.

BRIEF DESCRIPTION OF THE DRAWINGS

An embodiment of the invention is described in the accompanying drawings. The drawings are briefly described below.

FIG. 1 is an electrical circuit schematic of an embodiment of the invention for powering an electrically powered device.

FIG. 2 is an electrical circuit schematic of an embodiment of the invention for powering an electrically powered device.

FIG. 3 is an electrical circuit schematic of an embodiment of the invention for charging an electrically powered device that is a rechargeable battery.

DETAILED DESCRIPTION OF SOME EMBODIMENTS OF THE INVENTION

Concerns about global warming have thrust energy efficiency to the forefront of public opinion. Standby power is that power consumed when electrical devices are not used or are disconnected. The wasted standby power of individual household and office electrically powered devices is typically very small, but the sum of all such electrically powered devices within these places becomes significant. Standby power makes up a portion of homes' and offices' steadily rising miscellaneous electric load, which also includes small electrically powered devices, security systems, and other small power draws.

For any single electrically powered device the load is typically not very large (the most inefficient designs draw 15-20 W), however when factored over all of the electrically powered devices in a country like the United States, the load can come to billions of watts. Some studies have suggested the total standby load caused by the United States alone would provide enough power to handle the electric needs of Vietnam, Peru and Greece.

A significant amount of standby power consumption is truly wasted. Some of the standby power consumed by electrically powered devices is used to maintain useful functions. These functions include, for example, clocks to permit timed operations or delayed-time control operation, and circuits to permit continuous reception of information like faxes, virus protection packets, and emails in communication devices. Other standby power is merely used to maintain functions often considered needless when devices are plugged into sources of power but are not used. These functions include, for example, circuits that perform "instant on" functions, remote control access waiting for the user to interact or a device to be used, or monitoring functions to adjust current draw during specified times.

A subset of this wasted power consumption is from external electrical power adapters that are left attached to a source of electrical power but are detached for a time from the electrical device that the adapter is designed to power or recharge. Such adapters include but are not limited to those for operating computers, diagnostic devices, routers and the like, recharging portable computers, cell phones and other portable communication devices, and portable electrical devices containing rechargeable power storage units in general. These adapters may already be attached to power source sockets in rooms where users may attach them to or detach them from their electrical device. Also a user may have multiple adapters, such as one at home and one at an office, or one in different offices with which to use with a particular type of electrical device. Alternatively, a user may leave a particular adapter that is used for charging a portable device, such as, for example, a cell phone or a portable laptop computer, always attached to a particular source of power to avoid losing the adapter when needed or repeatedly unplug and plug in the adapter.

These adapters constantly consume some power. Standby power is continuously consumed by the circuits and transformers and converted into heat. Recent efforts by others have only served to reduce the amount of wasted power, often at the cost of more complex monitoring circuitry and internal batteries that, in turn, must be recharged and occasionally replaced to keep the adapter ready to use. When the rechargeable batteries are completely discharged or no longer rechargeable, the adapter may be left unable to power a device until the battery is replaced.

Although the power needed for these monitoring functions and power conversion elements is only in the milliwatt range, the actual power consumed is much more. Because the power levels required are so low, conversion from source power form to useful power form typically occurs at a very low efficiency. As a result, the power consumed from a source of power is often in the range of 1 W to 10 W or more, even when only a few tens of mW or less are needed. Still, the load is never very large for any single electrically powered device.

This power consumption is believed to be having a significant effect in global warming. The most inefficient designs draw may draw up to 20 W and governments are beginning to require more electrical devices to consume no more that 1 W of power when in a standby mode. However, there are millions of such power adapters in use around the world consuming electrical power when they are connected to line voltage but not connected to an electrically powered device. Collectively, these electrically powered devices consume a significant amount of power, necessitating the construction of additional electricity-producing plants, in many cases the consumption of some type of fuel, and often the release of pollutants into the environment.

My invention provides a way to significantly reduce wasted power consumption by eliminating the significant and growing cause of the waste, external power adapters plugged into sourced of power but unattached from the electrical device they are intended to power. Because my invention eliminates the power consumption of electrical power adapters in this state, it is more convenient than present adapters. My invention permits a user to perform, without concern or guilt about consumption of wasted power, such practices as leaving power adapters for portable cell phones or laptops plugged in to a wall socket to avoid losing them when needed and to avoid constantly plugging and unplugging the adapter. In addition, since this practice is already common, my invention will reduce the need for electrical power generating capacity when the savings are aggregated over a population of users.

The invention has three aspects, an apparatus, a system and a method. Embodiments of each will be discussed in more detail to better convey an understanding of the invention.

Apparatus Aspect

I have invented an external electrical power adapter apparatus that is able to be electrically attached to a source of electrical power without drawing any power from any source of electrical power including an internal rechargeable battery when the adapter is physically disconnected from an electrical device that consumes electrical power. The power adapter apparatus aspect comprises a power-accessing plug, a power supply circuit, a first connector with a mechanical switch, and a second connector.

The power-accessing plug is electrically connected to an external source of electrical power. The power adapter apparatus is generally designed to convert a particular type of electrical power into one that is useful for consumption by an attached electrical device. Thus the power-accessing plug is designed to receive such input power. Input electrical power may be in any form that is required by the adapter and includes, for example, power from AC such as single phase, two phase and three phase AC, and power from direct current (DC) of specified voltage and current. Depending on the type of the source power, the plug prongs may be hot, neutral, ground, positive or negative and may number two or more. One common embodiment has a power-accessing plug that is attached to AC power and the power-accessing plug comprises a hot prong and a neutral prong suitable for accessing AC power. Another common embodiment has a power-accessing plug that is attached to a DC power source with the power-accessing plug comprising a positive prong and a negative prong suitable for accessing DC power. Prongs are loosely defined to mean electrical contacts and include, for example, traditional conductive blades and rods as well as post and cylindrical connectors such as, for example, those used to attach cigarette lighters to automobiles. Power-accessing plugs are well known in the art and are easily available in the form required by an intended source.

The power supply circuit comprises circuitry to convert the external electrical source power into an electrical form useful for consumption by an electrical device. Depending on the device, this form may be any form required by the device. Such forms include, for example, AC power of a specified wave form, AC power of a specified frequency, AC power of a specified voltage, AC power of a specified current, DC power of a specified voltage, and DC power of a specified current. Other forms may be required depending on the particular design of the electrical device. Power supply circuits may include, for example, an AC to DC converter or a down-converting transformer to supply lower voltage AC to an electrical device. Power supply circuits draw power if current passes through them, even if the electrical device is detached from the power adapters. It is well known in the art how to build a power supply circuit that is able to provide power of a specified form required by an electrical device.

In addition to the power supply circuits described above, some external power adapters known to the art have circuits designed to monitor current draw from the second connector by the attached electrical device. When the current draw drops to some preprogrammed level, some monitoring circuits reduce the power consumed to some level known as stand-by power. Others shut off the power consumption by the attached electrical device when voltage required falls below a set amount. Still others use electrically activated switches run by controllers and rechargeable batteries located in the attached device to shut off the power to the power adapter when the attached device is shut off and after the batteries are recharged.

None of these completely stop adapter power consumption the moment the device is removed from the adapter. Some only reduce the consumption from sources of power. Other adapters intermittently draw power from sources of power internal to recharge internal batteries or determine if the device is attached and thus needing power. Still others use controllers and rechargeable batteries in the attached devices to turn on the adapters when the device is turned on and are not meant to eliminate power consumption by adapters when devices are detached from them. All of these power adapters consume some power, even from a battery that itself is periodically recharged, when an electrical device is unattached. My apparatus contains no internal electrical power storage unit, rechargeable or otherwise, from which power is consumed by the apparatus when it is detached from the electrical device. Thus no power is consumed from any external or internal source of electrical power when the apparatus is attached to a source of power and the electrical device is disconnected from the apparatus.

The first connector is electrically connected to the plug and the power supply circuit, and comprises a switch. In some embodiments of the adapter apparatus the electrical connection is through a cable to the plug. In other embodiments, the connection is through wires and the plug is affixed to a shell containing the power supply circuit.

The mechanical switch is a normally open switch, essentially an automated on/off function. It (1) has an open position when the apparatus is not electrically and physically attached to an electrically powered device and (2) has a closed position when the apparatus is electrically and physically attached to the electrical device whereby current is able to flow through the apparatus. When the switch is in the open position, the open switch is able to prevent the consumption of any electrical power by the power adapter when the plug is electrically connected to the source of electrical power. Such switches are well known in the art and readily available in various forms.

The second connector comprises a first end electrically attached to the power supply circuit and a second end removeably and electrically attached to the electrically powered device. Generally there is a cable between the first end and the second end. The electrical device that is to be attached to the apparatus aspect of my invention can be any that needs power adapted from that of the source power. As mentioned earlier, some devices may attach to different power adapters of the invention at different locations. Other devices may contain rechargeable power supply units such as, for example, batteries or capacitor circuits, that need to be recharged to allow the device to be used in a portable manner independent of sources of power for a time.

The core of my invention is the use of the normally open mechanical switch and the location of the switch. The normally open mechanical switch is well known, comes in a variety of styles depending on the situation, and is more reliable than electrical switches that are subject to failure when current is interrupted. Traditionally, power adapters plugged into sources of power have always drawn current even when no electrical device is attached. The power consumption is low and the convenience of merely having to attach an electrical device and use it or recharge it has been desirable. In addition, power adapters with electrically activated switches powered by internal rechargeable batteries are inherently less reliable because they cease to work if the battery is unable to deliver power. However, surprisingly, I found that normally open mechanical switches could reliably eliminate power consumption by power adapters in this situation if placed in a specific location. It was ironic to me that the solution that finally completely eliminated the power waste was a simple one based on the location of a normally open mechanical switch. Previous traditional external power adapters did not have on and off switches but were merely plugged into or unplugged from sources of power. With a location before the power supply circuit of the mechanical switch, all power consumption by the apparatus was eliminated when the apparatus was still attached to a source of power and the convenience of usage was not lost. Also, this was accomplished without the need for additional complex monitoring circuits that themselves required power. This discovery has wide reliable application and minimal alteration cost to implement in virtually all external power adapter designs currently in use where one desires to detach the electrical device from the adapter while leaving the adapter plugged into a source of power.

The second connector comprises a first end electrically attached to the power supply circuit and a second end removeably electrically attachable to the electrically powered device so as to be able to convey power to the attached device. In some embodiments of my invention, the switch is physically but not electrically attached to the second end. In other embodiments the switch is both physically and electrically attached to the second end. In still other embodiments the switch is neither physically nor electrically attached to the second end.

It was surprising that the solution was so simple yet overlooked until now. It was also surprising that the placement of the normally open switch in the first connector of an external power adapter was not taught or suggested before. However it appears to be both a matter of convenience and a recent awareness of the importance of eliminating wasted power on an aggregated basis. While a manual on/off switch would also eliminate the power waste, it would not be convenient enough to become widely used. Similarly, merely unplugging the adapters when not attached to an electrical device would eliminate the waste power but this is also is not widely used. In recent years, global warming concerns and rising costs of energy have made the waste issue more of a concern. But habits have formed around convenience and are hard to change when personal expense is not great and the largest benefits are only seen when waste savings is aggregated over many users. Thus, my invention is timely in that it allows a form of wasted power to be eliminated while not requiring any change of habits on the part of users of external adapters.

With a location before the power supply circuit, all power consumption by the apparatus was eliminated when the switch was open even though the apparatus was still attached to a source of power. The only element upstream of the switch was the power-accessing plug, an element that did not consume power by itself. This discovery has wide application and minimal implementation costs in most if not all external power adapter designs currently in use.

Discussion of several embodiments will help illustrate the diversity and simplicity of my invention. The same elements are labeled with the same numbers.

In one embodiment the mechanical switch is physically but not electrically attached to the second end of the second connector that is removeably electrically attachable to the electrical device. Some examples of electrically powered devices that can use this type of embodiment are devices that need external power adapters such as, for example, computers and routers or devices that contain rechargeable power storage units such as, for example portable computers or cell phones. FIG. 1 is an electrical circuit schematic of this embodiment. Various physical adapters may encompass the schematic shown. Referring to FIG. 1, an external power adapter apparatus (10) includes a power-accessing plug (20) that is illustrated as a two prong plug such as used, for example, with single phase AC power sources with a hot prong and a neutral prong. Other arrangements are also possible depending on the type of power source available and may have two hot prongs, positive and negative prongs, three prongs or some other configuration depending on the nature of the electrical source power. Plug 20 is attached directly to a power supply circuit (30) with a first wire (40) of a first connector (50). Plug 20 is also attached indirectly to power supply circuit 30 with a second wire (60) connected to a normally open mechanical switch (70) that is connected to a third wire (80) that is finally connected to power supply circuit 30. In the case where plug prongs are hot and neutral, first wire 40 may be hot or neutral and second wire 60 may be hot or neutral and different from first wire 40. In one physical manifestation of apparatus 10, plug 20 may be separated from circuit 30 by a distance. In another manifestation, plug 20 may be affixed to a housing (not shown) containing circuit 30 in the embodiment shown. The second connector (90) attaches power supply circuit 30 to the electrically powered device (100) through a fourth wire (110) and a fifth wire (120) that are designed to convey the form of power needed by device 100 when apparatus 10 is attached to device 100. Two wires are shown but more may be needed depending on the type and form of power conveyed. At the end (130) that enters device 100, wires 110, 120 are physically but not electrically attached to switch 70 to form a male plug (140) that can connect with device 100 through a female socket (150). When male plug 140 is inserted into female socket 150, switch 70 is urged into a closed state. When male plug 140 is removed from female socket 150, switch 70 returns to its normally open state. Thus, no electrical power is wasted while apparatus 10 is disconnected from electrically powered device 100.

In another embodiment the mechanical switch is physically attached to the second end of the second connector and electrically attached to both the power supply circuit and second end of the second connector that is removeably electrically attachable to the electrical device. Some examples of electrically powered devices that can use this type of embodiment are devices that need external power adapters such as, for example, computers and routers or devices that contain rechargeable power storage units such as, for example portable computers or cell phones. FIG. 2 is an electrical circuit schematic of this embodiment. Various physical adapters may encompass the schematic shown. Referring to FIG. 2, external power adapter apparatus 10 includes power-accessing plug 20 that is illustrated as a two prong plug such as used, for example, with single phase AC power sources with a hot prong and a neutral prong. Other arrangements are also possible depending on the type of power source available and may have two hot prongs, positive and negative prongs, three prongs or some other configuration depending on the nature of the electrical source power. Plug 20 is attached directly to power supply circuit 30 with first wire 40 of first connector 50. Plug 20 is also attached indirectly to power supply circuit 30 with second wire 60 connected to normally open mechanical switch 70 that is connected to third wire 80 that is finally connected to power supply circuit 30. In the case where plug prongs are hot and neutral, first wire 40 may be hot or neutral and second wire 60 may be hot or neutral and different from first wire 40. In one physical manifestation of apparatus 10, plug 20 may be separated from circuit 30 by a distance. In another manifestation, plug 20 may be affixed to a housing (not shown) containing circuit 30 in the embodiment shown. Second connector 90 attaches power supply circuit 30 to electrically powered device 100 through fourth wire 110. Fifth wire 120 connects third wire 80 to device 100 when apparatus 10 is attached to device 100. At end 130 that enters device 100, wire 110 is joined by wire 120 and switch 70 to form male plug 140 that can connect with device 100 through female socket 150. When male plug 140 is inserted into female socket 150, switch 70 is urged into a closed state. When male plug 140 is removed from female socket 150, switch 70 returns to its normally open state. Thus, no electrical power is wasted while apparatus 10 is disconnected from electrically powered device 100.

In still another embodiment the mechanical switch is neither physically nor electrically attached to the second end of the second connector. Some examples of electrically powered devices that can use this type of embodiment are electrical devices that require insertion of the device into a receptacle element of the adapter such as, for example, rechargeable batteries. FIG. 3 is an electrical circuit schematic of this embodiment. Various physical adapters may encompass the schematic shown. Referring to FIG. 3, external power adapter apparatus 10 includes power-accessing plug 20 that is illustrated as a two prong plug such as used, for example, with single phase AC power sources with a hot prong and a neutral prong. Other arrangements are also possible depending on the type of power source available and may have two hot prongs, positive and negative prongs, three prongs or some other configuration depending on the nature of the electrical source power. Plug 20 is attached directly to power supply circuit 30 with first wire 40 of first connector 50. Plug 20 is also attached indirectly to power supply circuit 30 with second wire 60 connected to normally open mechanical switch 70 that is connected to third wire 80 that is finally connected to power supply circuit 30. In the case where plug prongs are hot and neutral, first wire 40 may be hot or neutral and second wire 60 may be hot or neutral and different from first wire 40. In one physical manifestation of apparatus 10, plug 20 may be separated from circuit 30 by a distance. In another manifestation, plug 20 may be affixed to a housing (not shown) containing circuit 30 in the embodiment shown. Second connector 90 attaches power supply circuit 30 to electrically powered device 100 through fourth wire 110 and fifth wire 120 that are designed to convey the form of power needed by device 100 when apparatus 10 is attached to device 100 in a receptacle (not shown). Two wires are shown but more may be needed depending on the type and form of power conveyed. As device 100 is inserted between wires at second end 130 to electrically connect with wire 110 and wire 120, device 100, also shown in dashed lines, presses switch 70 into a closed position allowing for current to flow from plug 20 through apparatus 10 and into device 100. When device 100 is removed from adapter 10, pressure on switch 70 is removed and the switch returns to its normally open state. Thus, no electrical power is wasted while power adapter 10 is disconnected from electrically powered device 100. FIG. 3 shows a battery in dashed lines positioned over switch 70 to illustrate how this type of normally open pressure-activated switch is closed.

System Aspect

I have also invented a system that is able to supply electrical power through external electrical power adapters to electrical devices when attached to them and a source of power and not consume power from the source of power or an internal power storage unit in the adapter when detached from the device but still attached to the source of power. Often electrical device manufacturers sell systems comprising electrical devices and external power adapters. They also provide additional external power adapters to customers for use with their electrical devices when more than one is desired or when one malfunctions. Such systems include, for example, portable communication devices such as cell phones, smart phones, and PDAs, and computers, both desktop and laptop. Often it is convenient to leave the external power adapter part of the system plugged into a power source when the electrical device is detached. My system reduces power consumption of the system when the electrical device is detached by eliminating the power consumption of the external power adapter that is plugged into the source.

The system aspect of my invention comprises an electrically powered device and an external power adaptor apparatus. The electrically powered device is any that is powered or recharged by an external power adapter apparatus. Such devices have been described above. The external power adapter apparatus is any adapter designed to power or to recharge the electrically powered device and that is able to remain attached to a source of power without consuming power from any external or internal source when detached from the device. Such an apparatus has been already described above.

Method Aspect

I have further invented a method of using an external electrical power adapter to convey power to an electrical device without the adapter consuming power from any source when the device is not electrically attached to the adapter and the adapter is electrically attached to an external source of electrical power. This method retains the convenience for a user to always have a power adapter ready to attach to an electrical device when needed without requiring the user to do further steps, particularly when time is short. Such further inconvenient steps include, for example, finding the adapter, finding a power source to attach to the adapter, and manually plugging it into or out of a source of power.

The method comprises four steps. One step is providing an external electrical power adaptor apparatus as described above. Another step is electrically attaching the power adapter to an external source of electrical power. Still another step is electrically and physically attaching the electrically powered device to the power adapter apparatus and thereby closing the switch to permit current to flow to the power adapter apparatus and device. Another step is removing the electrically powered device from the electrical and physical connection with power adapter apparatus to thereby open the switch to stop the flow of current to the power adapter apparatus. In this manner, electrical power is no longer consumed by the power adapter apparatus even though the apparatus is electrically attached to the external source of electrical power.

The method may further comprise another step of leaving the detached apparatus for an extended period of time without wasted power consumption. This step comprises leaving the power adapter apparatus electrically attached to the source of electrical power without any manual switching action on part of a user and without any more power being drawn from any external or internal source of power by the apparatus. Thus, a user retains the convenience of always knowing where the adapter is but not the guilt of constantly consuming power even when the apparatus is detached from the device.

The method may also comprise a further step of ready reuse without wasted power consumption. This step comprises reattaching the electrical device to the power adapter apparatus and thereby closing the switch to permit power to flow through the apparatus and electrical device. The user is able to conveniently reattach the device to the apparatus without having to first attach the apparatus to the source of power or locate it and a source of power. This convenience is obtained without wasted power consumption while the device was detached from the adapter apparatus.

Other modifications and changes made to fit particular operating requirements and environments will be apparent to those with ordinary skill in the art. Thus, the invention is not considered limited to the embodiments discussed for purposes of disclosure and covers all changes and modifications that do not constitute departures from the true spirit and scope of this invention.

I claim:

1. An external electrical power adaptor apparatus, comprising,
   a power-accessing plug able to electrically connect to an external source of electrical power;
   a power supply circuit comprising circuitry to convert the external electrical source power into an electrical form useful for consumption by an electrical device;
   a first connector that is electrically connected to the plug and the power supply circuit, the first connector, comprising,
      a mechanical switch (1) having an opened position when the apparatus is not electrically and physically attached to an electrically powered device where the open switch prevents the consumption of any and all electrical power by the power adapter apparatus when the plug is electrically connected to the source of electrical power and (2) having an automatically closed position when the apparatus is electrically and physically attached to the electrical device whereby current is able to flow through the apparatus; and
   a second connector comprising a first end electrically attached to the power supply circuit and a second end removeably, electrically, and physically attachable to the electrically powered device so as to be able to convey power to the attached device.

2. The power adapter apparatus of claim 1 wherein the source of electrical power is alternating current power, the power-accessing plug comprises a hot prong and a neutral prong suitable for accessing alternating current power, and the power supply circuit is able to convert the alternating current electrical power into a form of power suitable for consumption by the electrical device from at least one of a group consisting of alternating current power of a specified wave form, alternating current power of a specified frequency, alternating current power of a specified voltage, alternating current power of a specified current, direct current power of a specified voltage, and direct current power of a specified current.

3. The power adapter apparatus of claim 1 wherein the source of electrical power is direct current power, the power-accessing plug comprises a positive prong and a negative prong suitable for accessing direct current power, and the power supply circuit is able to convert the direct current electrical power into a form of power suitable for the electrical device from at least one of a group consisting of alternating current power of a different wave form, alternating current power of a different frequency, alternating current power of a specified voltage, alternating current power of a specified current, direct current power of a specified voltage, and direct current power of a specified current.

4. The power adapter apparatus of claim 1 wherein the apparatus contains no internal rechargeable electrical power storage unit configured to supply any electrical power to the apparatus when the second connector is unattached from the electrical device.

5. The power adapter apparatus of claim 1 wherein the electrical device comprises an external rechargeable electrical power storage unit.

6. The power adapter apparatus of claim 1 wherein the switch is physically but not electrically attached to the second end of the second connector that is removeably electrically attachable to the electrical device.

7. The power adapter apparatus of claim 1 wherein the switch is both physically and electrically attached to the second end of the second connector.

8. The power adapter apparatus of claim 1 wherein the mechanical switch is able to be closed with the physical attachment of the electrical device to the power adapter apparatus that urges the switch into a closed position.

9. The power adapter apparatus of claim 1 wherein the normally open switch is neither physically nor electrically attached to the second end of the second connector the switch is in an electrically closed position when the second end is physically and electrically attached to the electrical device and the switch is in an electrically open position when the second end is not physically and electrically attached to the electrical device.

10. An electrically powered system, comprising,
    an electrically powered device and
    an external electrical power adaptor apparatus able to supply power to the electrical device, comprising,
    a power-accessing plug able to electrically connect to an external source of electrical power;
    a power supply circuit comprising circuitry to convert the external electrical source power into an electrical form useful for consumption by an electrical device;
    a first connector electrically connecting the plug and the power supply circuit, the first connector, comprising,
       a mechanical switch (1) having an opened position when the apparatus is not electrically attached to an electrically powered device where the open switch prevents the consumption of any and all electrical power by the power adapter apparatus when the plug is electrically connected to the source of electrical power and (2) having an automatically closed position when the apparatus is electrically attached to the electrical device whereby current is able to flow through the apparatus; and
    second connector comprising a first end electrically attached to the power supply circuit and a second end removeably, electrically, and physically attachable to the electrically powered device so as to be able to convey power to the attached device.

11. The system of claim 10 wherein the apparatus contains no internal rechargeable electrical power storage unit configured to supply any electrical power to the apparatus when the second connector is unattached from the electrical device.

12. The system of claim 10 wherein the electrical device comprises an external rechargeable electrical power storage unit.

13. The system of claim 10 wherein the switch is physically but not electrically attached to the second end of the second connector.

14. The system of claim 10 wherein the mechanical switch is physically moveably attached to the second end of the second connector, the switch is in an electrically closed position when the second end is physically and electrically attached to the electrical device and the switch is in an electrically open position when the second end is not physically and electrically attached to the electrical device.

15. The system of claim 10 wherein the switch is both physically and electrically attached to the second end of the second connector.

16. The system of claim 10 wherein the switch comprises a normally open switch where the switch is closed with the insertion of the electrical device into the power adapter apparatus that presses the conductive plate into electrical contact points.

17. The system of claim 10 wherein the normally open switch is neither physically nor electrically attached to the second end of the second connector, the switch is in an electrically closed position when the second end is physically and electrically attached to the electrical device and the switch is in an electrically open position when the second end is not physically and electrically attached to the electrical device.

18. A method of using an external electrical power adapter to convey power to an electrical device without the adapter consuming power from any source when the device is not electrically attached to the adapter and the adapter is electrically attached to an external source of electrical power, comprising, providing an electrical power adaptor apparatus, comprising, a power-accessing plug able to electrically-connect to an external source of electrical power;

a power supply circuit comprising circuitry to convert external electrical source power into an electrical form useful for consumption by an electrical device;

a first connector electrically connecting the plug and the power supply circuit, the first connector, comprising, a mechanical switch (1) having an opened position when the apparatus is not electrically and physically attached to an electrically powered device where where the open switch prevents the consumption of any and all electrical power by the power adapter apparatus when the plug is electrically connected to the source of electrical power and (2) having an automatically closed position when the apparatus is electrically and physically attached to the electrical device whereby power is able to flow through the apparatus; and a second connector comprising a first end electrically attached to the power supply circuit and a second end removeably, electrically, and physically attachable to the electrically powered device so as to be able to convey power to the attached device;

electrically attaching the power adapter to an external source of electrical power;

electrically attaching an electrically powered device to the power adapter apparatus and thereby closing the switch to permit current to flow to the power adapter apparatus and device; and removing the electrically powered device from electrical and physical connection with power adapter apparatus and thereby opening the switch so that electrical power is no longer consumed by the power adapter apparatus even though the apparatus is electrically attached to the external source of electrical power.

19. The method of claim 18, further comprising, leaving the power adapter apparatus electrically attached to the source of electrical power without any manual switching action on part of a user and without any more power being drawn from any external or internal source of power by the apparatus.

20. The method of claim 18, further comprising, reattaching the electrical device to the power adapter apparatus and thereby closing the switch to permit power to flow into the apparatus and electrical device.

\* \* \* \* \*